United States Patent
Lee

(10) Patent No.: US 9,347,556 B2
(45) Date of Patent: May 24, 2016

(54) DUAL SHIFT FORK

(71) Applicant: HYUNDAI MOTOR COMPANY, Seoul (KR)

(72) Inventor: Kyung Woo Lee, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/546,874

(22) Filed: Nov. 18, 2014

(65) Prior Publication Data

US 2016/0033036 A1 Feb. 4, 2016

(30) Foreign Application Priority Data

Aug. 1, 2014 (KR) .................. 10-2014-0098853

(51) Int. Cl.
*F16H 63/32* (2006.01)

(52) U.S. Cl.
CPC .......... *F16H 63/32* (2013.01); *F16H 2063/325* (2013.01)

(58) Field of Classification Search
CPC ... F16H 63/32; F16H 2063/325; F16H 63/20; F16H 63/30; F16H 63/34
USPC .......................................... 74/473.37, 473.36
See application file for complete search history.

(56) References Cited

U.S. PATENT DOCUMENTS

| | | | | |
|---|---|---|---|---|
| 3,242,759 A * | 3/1966 | Magg | ...................... | F16H 63/20 74/473.25 |
| 4,273,004 A * | 6/1981 | Morrison | .............. | F16H 59/042 74/473.12 |
| 4,529,077 A * | 7/1985 | Renaud | ................... | F16C 11/12 192/99 S |
| 4,716,779 A * | 1/1988 | Heinzelmann | .......... | F16H 63/30 74/473.1 |
| 5,802,916 A * | 9/1998 | Ebinger | ................... | F16H 63/30 74/360 |
| 6,070,486 A * | 6/2000 | Toyota | ..................... | F16H 63/32 192/115 |
| 6,374,692 B1 | 4/2002 | Steinberger et al. | | |
| 6,823,755 B2 * | 11/2004 | Koerber | ................... | F16H 61/32 74/335 |
| 6,854,353 B2 * | 2/2005 | Koerber | .............. | F16H 63/3023 74/335 |
| 7,089,821 B2 * | 8/2006 | Schaefer | ............... | F16H 63/206 74/335 |
| 7,946,190 B2 * | 5/2011 | Horing | ..................... | F16H 63/30 74/473.1 |
| 2010/0095797 A1 * | 4/2010 | Reichert | ................. | F16H 63/30 74/473.36 |
| 2010/0116076 A1 * | 5/2010 | Hoering | .................. | F16H 63/32 74/473.37 |

FOREIGN PATENT DOCUMENTS

| | | |
|---|---|---|
| JP | 2012-026540 A | 2/2012 |
| KR | 2000-0045753 A | 7/2000 |
| KR | 10-2009-0132367 A | 12/2009 |
| KR | 10-2013-0033761 A | 4/2013 |
| KR | 10-1518242 B1 | 5/2015 |

* cited by examiner

*Primary Examiner* — William Kelleher
*Assistant Examiner* — Leonard J Archuleta
(74) *Attorney, Agent, or Firm* — McDermott Will & Emery LLP

(57) ABSTRACT

A dual shift fork includes a sliding fork and a rotary fork rotatably connected to the sliding fork. A pair of pad members are disposed on an inner side of both ends of the sliding fork. A sleeve disposed at an inner side of the sliding fork and contacting the pad members. The pad members are simultaneously engaged with the sliding fork and the rotary fork at an inner side of both ends of the rotary fork. The rotary fork rotates at a predetermined angle with respect to the sliding fork as the sleeve moves independently from the sliding fork.

9 Claims, 4 Drawing Sheets

DUAL SHIFT FORK

CROSS-REFERENCE TO RELATED APPLICATION

The present application claims the benefit of priority to Korean Patent Application Number 10-2014-0098853 filed on Aug. 1, 2014, the entire contents of which application are incorporated herein for all purposes by this reference.

TECHNICAL FIELD

The present disclosure relates, in general, to a dual shift fork, and more particularly, to a dual shift fork with an improved structure of shift forks for shifting to two selective gears with synchro hubs and sleeves.

BACKGROUND

A shifting mechanism of a manual transmission will be described with reference to FIG. 1 to help understanding of the present disclosure.

As shown in FIG. 1, the shifting mechanism of a manual transmission 1 includes a shift lever 4 that disposed directly on a housing 2 of the manual transmission 1 to turn and transmits an operation force applied by a driver. A shift rail 6 is coupled to a lower end of the shift lever 4 and axially moves by operation force of the shift lever 4. A shift fork 10 is fixed to one end of the shift rail 6 and engaged with a sleeve 8 of a synchronizer.

In this configuration, a plurality of shift rails 6 are provided in the manual transmission 1, a shift lug 7 is formed at another end of the shift rail 6. A control finger 5 is engaged with the shift lug 7 and formed at the lower end of the shift lever 4.

According to this structure, the control finger 5 of the shift lever 4 is engaged with the shift lug 7 of any one of the shift rails 6. The shift lug 7 is engaged with the control finger 5 and axially moves by the operation force applied to the shift lever 4.

The shift fork 10 is composed of a fork seat 12 which is fixed to the one end of the shift rail 6, and a fork gripper 14 which is formed on a bottom of the fork seat 12 and grasps the sleeve 8. The one end of the shift rail 6 passes through the fork seat 12, and the fork seat 12 and the shift rail 6 are fixed by fasteners.

The fork gripper 14 has a semicircular shape to be fitted in a sleeve groove 8a formed on the sleeve 8 so that the sleeve 8 can rotate and axially move. A pad member (not shown) is attached to a portion, which comes in contact with an inner side of the sleeve groove 8a, of the fork gripper 14.

According to the shifting mechanism of the manual transmission which as this configuration, as a gear is selected by the shift lever 4, the control finger 5 of the shift lever is engaged with any one of the shift lugs 7, and then as the shift lever 4 is operated to shift, the control finger 5 of the shift lever 4 moves the shift lug 7 in an axial direction of the shift rail 6.

Accordingly, as the shift rail 6 moves by the shift lug 7, the shift fork 10 which is fixed to the shift rail 6 and the sleeve 8 move. As the sleeve 8 moves, a shift gear 16 is synchronized and engaged.

According to a 7-speed manual transmission, as shown in FIG. 2, five shift rails 6 are provided, and particularly, selection positions of an R-gear and a seventh gear are different, but their shifting directions are the same, so it is impossible to implement a gear trail that can shift with one synchro hub and one sleeve.

That is, the synchro hub and the sleeve are required for shifting to the R-gear and the seventh gear, respectively, and thus, manufacturing cost and a length of a gear train are increased.

There are a related art titled "Shift apparatus of manual speed change gear for use in automobile" and a related art titled "Shifting control apparatus for manual transmission."

In "Shift apparatus of manual speed change gear for use in automobile", a shift apparatus of a manual transmission for an automobile can shift to other gears in addition to shifting to two gears with one shift rail, but there is no structure of a dual shift fork, and shifting to two gears is performed by a detent structure, such that shifting is complicated. In "Shifting control apparatus for manual transmission", the volume of a shifting control apparatus is reduced, and components are simplified by connecting a control shaft directly with a shift fork, however, it does not provide implementing gears, in which the selection directions of the gears are different but shifting directions thereof are the same.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art and is intended to propose a dual shift fork that can shift to gears in which selection directions of gears are different but shifting directions thereof are the same, using a sliding fork and a rotary fork which share one pad member.

According to an exemplary embodiment of the present inventive concept, a dual shift fork includes a sliding fork and a rotary fork rotatably connected to the sliding fork. A pair of pad members are disposed on an inner side of both ends of the sliding fork. A sleeve disposed at an inner side of the sliding fork and contacting the pad members. The pad members are simultaneously engaged with the sliding fork and the rotary fork at an inner side of both ends of the rotary fork. The rotary fork rotates at a predetermined angle with respect to the sliding fork as the sleeve moves independently from the sliding fork. A pair of pivots may be formed at both sides of the rotary fork so that the rotary fork rotates relative to the sliding fork.

Through-holes may be formed at both lower sides of the sliding fork, slits may be formed at both lower sides of the rotary fork at positions corresponding to the through-holes, and the pad members may be inserted into the through-holes and the slits.

The pad members may each have a base of which one side is in contact with an outer side of the sleeve and a rotary portion extending from another side of the base and protruding through a corresponding slit.

As the sliding fork rotates, the pad members move in a moving direction of the sliding fork. As the rotary fork rotates at the predetermined angle about the pivots, the pad members move.

The pivots may include pivot bolts inserted in pivot holes formed at both middle sides of the rotary fork. A shift lug may be formed at a predetermined position on an upper end of the rotary fork so that a force can be transmitted when the rotary fork moves forward.

An insertion pipe through which a shift rail passes may be provided at the sliding fork, at a predetermined angle from a center of the sliding fork to allow the rotary fork to smoothly rotate about the pivots with a smooth movement of the sliding fork.

According to the dual shift fork of the present disclosure having this configuration, the follow effects are accomplished.

First, instead of having a structure in which shifting two gears with two synchro hubs and two sleeves of the related art, it is possible to shift to two gears by having different selection directions but same shifting directions with one synchro hub and one sleeve.

Second, since the number of synchro hubs and sleeves is reduced, it is possible to achieve freedom of a gear train layout and reduce a length of a transmission.

Third, since the number of synchro hubs and sleeves is reduced, it is possible to reduce weight and manufacturing cost.

BRIEF DESCRIPTION OF THE DRAWINGS

The above and other objects, features and other advantages of the present disclosure will be more clearly understood from the following detailed description when taken in conjunction with the accompanying drawings.

DETAILED DESCRIPTION

Hereinafter, exemplary embodiments of a dual shift fork of the present inventive concept will be described with reference to the accompanying drawings.

Figure 1:
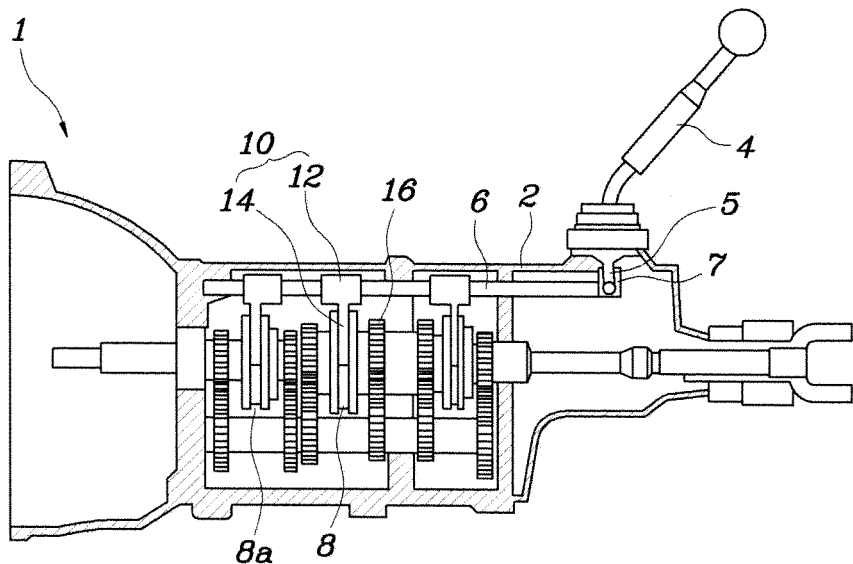
FIG. 1 is a cross-sectional view showing a shifting mechanism of a manual transmission according to the relate art.
Figure 2:
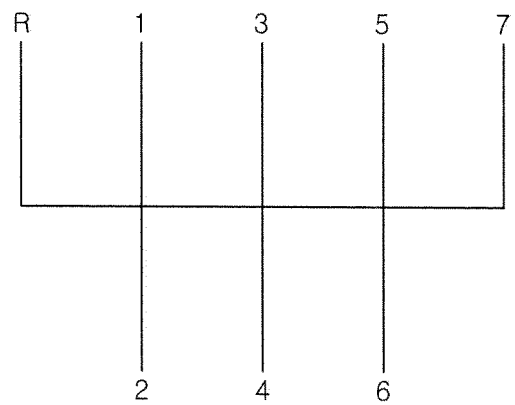
FIG. 2 is a view showing a configuration of a 7-speed manual transmission of the related art.
Figure 3:
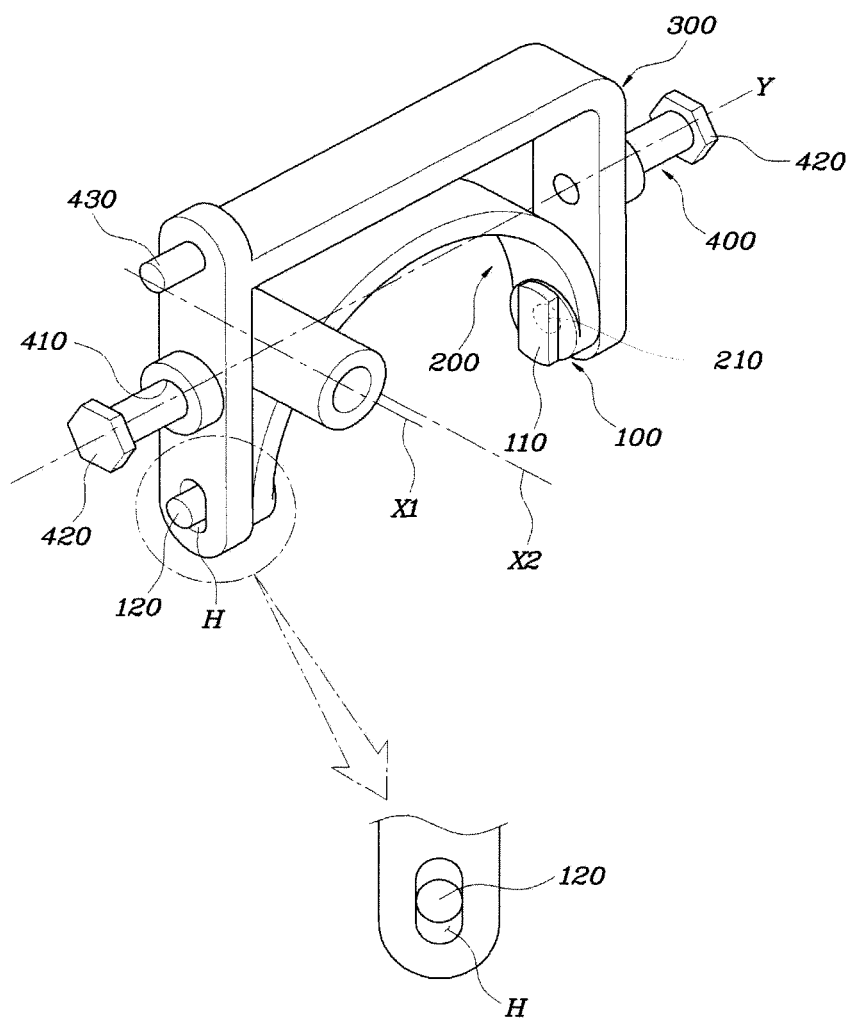
FIG. 3 is a perspective view showing a dual shift fork according to an embodiment of the present inventive concept.
Figure 5:
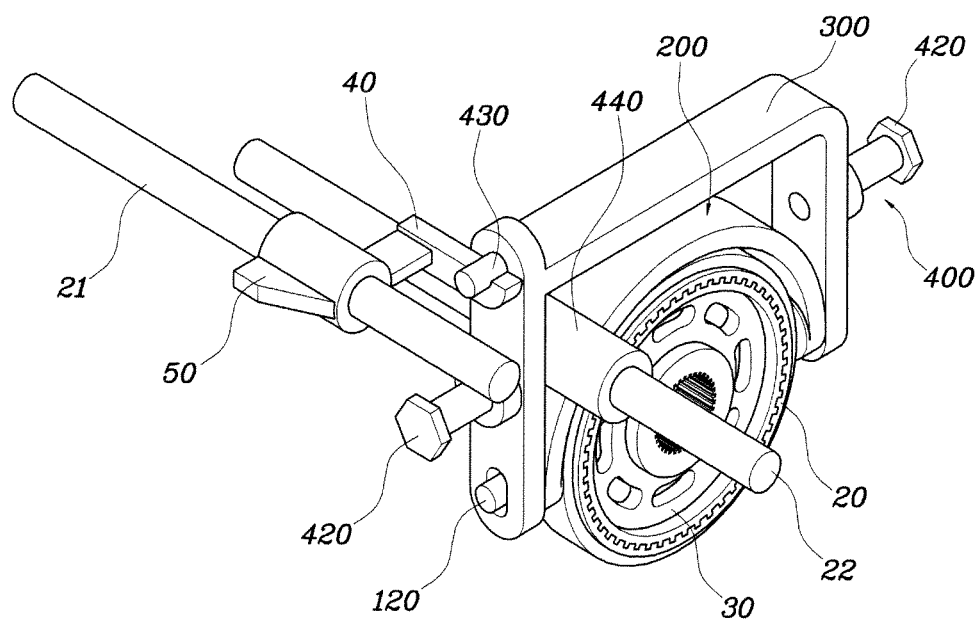
FIG. 5 is a view showing the entire configuration the dual shift fork with a shift rail and a sleeve.

FIG. 3 is a perspective view showing a dual shift fork according to an embodiment of the present inventive concept, and FIG. 5 is a view showing the entire configuration the dual shift fork with a shift rail and a sleeve.

As shown in FIGS. 3 and 5, the dual shift fork of the present disclosure includes a sliding fork 200 and a rotary fork 300. The sliding fork 200 is fixed to an insertion pipe 440 and has a semicircular shape to grip a 7/R-gear synchro sleeve 20.

A shift rail 22 passes through the insertion pipe 44. A pad member 100, which moves the sleeve 20, is in contact with an outer surface of the sleeve 20 and disposed on an inner side of both ends of the sliding fork 200.

The pad member 100 is simultaneously engaged with both the sliding fork 200 and the rotary fork 300, such that the rotary fork 300 rotates at a predetermined angle with respect to the sliding fork 200 to shift by moving the sleeve 20 independently from the sliding fork 200.

7-speed manual transmissions in the related art require two sleeves and two pads that come in contact with outer sides of the sleeves to shift to a seventh gear and an R-gear. However, according to the present disclosure, a pair of pad members 100 are provided to share one sleeve 20, such that a length of a transmission decreases, and weight and manufacturing cost are also reduced.

Since the sliding fork 200 and the rotary fork 300 share the same pad members 100, shifting to a selected gear is performed by rotation of the sliding fork 200 and rotation of the rotary fork 300 at a predetermined angle.

X1 is an axis of the shift rail 22 combined with the sliding fork 200, X2 is an axis of a main shaft (not shown) on which a plurality of gears (not shown) are arranged, and Y is a rotational axis of the rotary fork 300.

The rotary fork 300 has pivots 400 to be able to rotate at the predetermined angle. The rotary fork 300 shares the pad members 100 with the sliding fork 200 to be able to rotate with respect to the sliding fork 200.

The pivots 400 are pivot bolts 420 which are inserted in pivot holes 410, and the pivot holes 410 are formed at both sides of the rotary fork 300. Accordingly, as the rotary fork 300 rotates at the predetermined angle about the rotational axis Y which passes through centers of the pivot bolts 420, the pad members 100 shared by the sliding fork 200 move, such that the sleeve 20 being contact with the pad members 100 moves, and shifting to a selected gear is achieved.

Through-holes 210 are formed at both sides of the sliding fork 200, and slits H are formed at both sides of the rotary fork 300 at positions corresponding to the through-holes 210 of the sliding fork 200, such that the pad members 100 are inserted in the through-holes 210 and the slits H.

That is, the through-holes 210 of the sliding fork 200 have a predetermined-size and are formed at both lower ends of the sliding fork 200 so that the sliding fork 200 and the rotary fork 300 share the pad members 100. The slits H having a predetermined size and length are also formed at both lower ends of the rotary fork 300 at positions corresponding to the through-holes 210, and the pad members 100 are inserted in the through-holes 210 and the slits H. When the sliding fork 200 and the rotary fork 300 rotate and move in different directions, the pad members 100 move in a front-rear direction, and the sleeve 20 being in contact with the pad members 100 also move in the front-rear direction, thereby shifting.

Referring to FIG. 3, each pad member 100 is arranged in the same way at both sides of the sliding fork 200 and each includes a base 110 and a rotary portion 120.

One side of the base 110 is in contact with an outer side of the sleeve 20, and another side of the base 110 is in surface contact with an inner side of the sliding fork 200.

The rotary portion 120 protrudes with a predetermined distance in a direction of the rotational axis Y from the other side of the base 110, through a corresponding slit H.

Accordingly, though described below in relation to the operation, as the sliding fork 200 rotates forward, the rotary fork 300 connected by the pad members 100 rotates in a counterclockwise direction. An upper end of the rotary fork 300 rotates rearward, and the lower end thereof rotates forward about the pivots 400, and the rotary portion 120 moves forward accordingly.

The sleeve 20, which is in contact with the pad members 100 moving forward, also moves forward and is synchronized with a gear on the main shaft (not shown).

On the contrary, as the rotary fork 300 moves forward by an actuator (not shown), the upper end and the lower end of the rotary fork 300 rotate forward and rearward, respectively, at predetermined angles about the pivots 400, and the sliding fork 200 and the pad members 100 move rearward. Accordingly, the sleeve 20 being in contact with the pad members 100 moves rearward and is synchronized with the gear on the main shaft.

That is, as the sliding fork 200 moves, the pad members 100 move in a moving direction of the sliding fork 200, and shifting to a selected gear is performed. As the rotary fork 300 rotates about the pivots 400 at the predetermined angle, the pad members 100 move, and the shifting to a selected gear is performed.

A shift lug 430 protrudes with a predetermined length in a lateral direction from the upper end of the rotary fork 300 so that force can be transmitted to move the rotary fork 300 forward, and another lug may be connected to the shift lug 430 such that the force can be transmitted. As the shift lug 430 moves forward, the rotary fork 300 rotates clockwise at the predetermined angle.

Further, the insertion pipe 440 through which the shift rail 22 passes is provided at the sliding fork 200 at a predetermined angle from a center of the sliding fork 200 to allow the rotary fork 300 to smoothly rotate about the pivots 400 with a smooth movement of the sliding fork 200.

That is, if the insertion pipe 440 is disposed perpendicularly with respect to the center of the sliding fork 200, the sliding fork 200 and the rotary fork 300 may be in contact with each other by the insertion pipe 440 and their movement or rotation may not be smooth. Therefore, the insertion pipe 440 is provided at the predetermined angle from the center of the sliding fork 200.

Referring to FIG. 5, an R-gear lug 50 is connected to the shift lug 430 through a finger 40. An R-gear rail 21 passes through a hole in the R-gear lug 50, and the seventh gear shift rail 22 passes through the insertion pipe 440 of the sliding fork 200.

The sliding fork 200 surrounds the 7/R-gear synchro sleeve 20, and a 7/R-gear synchro hub 30 is disposed at the center of the synchro sleeve 20.

The operation of the dual shift fork of the present disclosure will be described hereafter with reference to FIGS. 4A-4C.

Figure 4A:
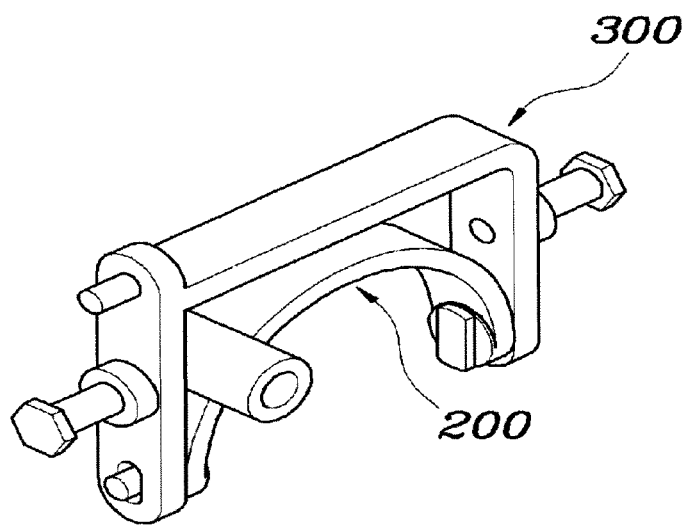
FIGS. 4A to 4C are views showing the operation of the dual shift fork according to an embodiment of the present inventive concept

FIG. 4A shows a 'neutral' state in which shifting to a seventh gear and an R-gear of which selection positions are different and shifting directions are the same in a 7-speed manual transmission.

Figure 4B:
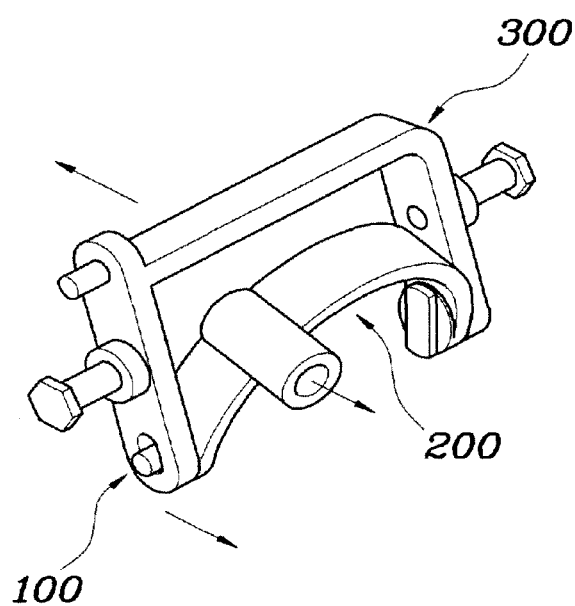

In FIG. 4B, when a shift rail (not shown) disposed through the insertion pipe 440 moves forward to shift to the seventh gear (not shown), the sliding fork 200 rotates forward, and the rotary fork 300 rotates in a counterclockwise direction at a predetermined angle about the pivots 400. The pad members 100 also move forward with a forward movement of the sliding fork 200, and the sleeve 20 (see FIG. 5) being in contact with the pad members 100 move forward. Accordingly, the sleeve 20 is synchronized with a gear on a main shaft (not shown), and shifting to the seventh gear is performed.

Figure 4C:
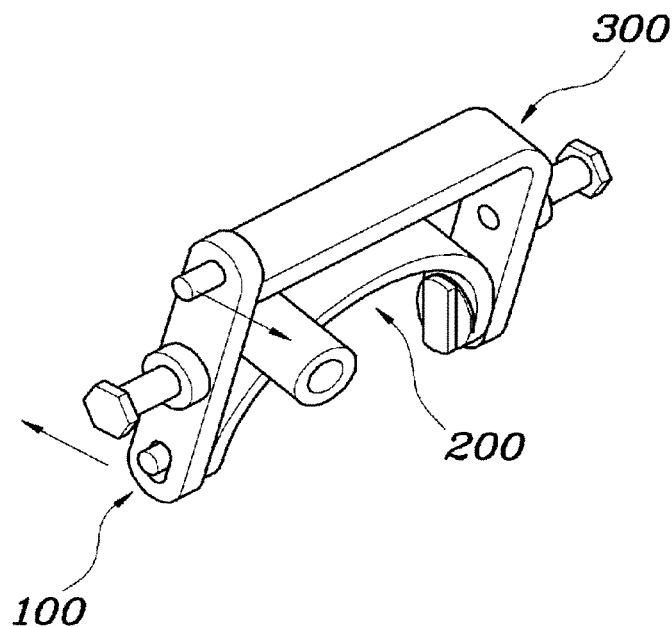

In contrast, referring to FIG. 4C, when the shift lug 430 (see FIG. 3 or 5) on the rotary fork 300 moves forward by an actuator (not shown) to shift to the R-gear (not shown), the rotary fork 300 rotates in a clockwise direction at a predetermined angle about the pivots 400. Then, the sliding fork 200 and the pad members 100 move rearward, such that the sleeve 20 is synchronized with a gear on the main shaft and the R-gear is engaged (not shown).

According to the present disclosure, in shifting to the seventh gear and the R-gear with different selection positions but with the same shifting directions, it is possible to shift to two gears of which the shifting directions are the same even with one sleeve by the rotary fork 300, the sliding fork 200, the pad members 100, and the pivots 400, thus achieving freedom of a gear train layout and reducing the weight and manufacturing cost, in addition to the length, of a transmission.

Although an exemplary embodiment of the present inventive concept has been described for illustrative purposes, those skilled in the art will appreciate that various modifications, additions, and substitutions are possible, without departing from the scope and spirit of the invention as disclosed in the accompanying claims.

What is claimed is:

1. A dual shift fork comprising:
   a sliding fork;
   a rotary fork rotatably connected to the sliding fork;
   a pair of pad members disposed on an inner side of both ends of the sliding fork; and
   a sleeve disposed at an inner side of the sliding fork and contacting the pad members,
   wherein the pad members are simultaneously engaged with the sliding fork and the rotary fork at an inner side of both ends of the rotary fork,
   wherein the rotary fork rotates at a predetermined angle with respect to the sliding fork as the sleeve moves independently from the sliding fork,
   wherein a pair of pivots are formed at both sides of the rotary fork so that the rotary fork rotates relative to the sliding fork, and
   wherein through-holes are formed at both lower sides of the sliding fork, slits are formed at both lower sides of the rotary fork at positions corresponding to the through-holes, and the pad members are inserted into the through-holes and the slits.

2. The dual shift fork of claim 1, wherein each of the pad members has a base of which one side is in contact with an outer side of the sleeve and a rotary portion extending from one side of the base and protruding through a corresponding slit.

3. The dual shift fork of claim 1, wherein as the sliding fork rotates, the pad members move in a moving direction of the sliding fork, and
   as the rotary fork rotates at the predetermined angle about the pivots, the pad members move.

4. The dual shift fork of claim 3, wherein the pivots include pivot bolts inserted in pivot holes formed at both middle sides of the rotary fork, and
   a shift lug is formed at a predetermined position on an upper end of the rotary fork so that a force can be transmitted when the rotary fork moves forward.

5. The dual shift fork of claim 3, wherein an insertion pipe through which a shift rail passes is provided at the sliding fork at a predetermined angle from a center of the sliding fork to allow the rotary fork to smoothly rotate about the pivots with a smooth movement of the sliding fork.

6. The dual shift fork of claim 4, wherein the shift lug includes:
   an R-gear lug which is connected to the shift lug through a finger; and
   an R-gear rail passing through the R-gear lug.

7. The dual shift fork of claim 4, wherein the sleeve includes:
   a hub disposed at a center of the sleeve.

8. The dual shift fork of claim 2, wherein another side of the base is in surface contact with the inner side of both ends of the sliding fork.

9. The dual shift fork of claim 1, wherein the sliding fork has a semicircular shape.

* * * * *